(12) United States Patent
Striano et al.

(10) Patent No.: US 6,756,911 B2
(45) Date of Patent: Jun. 29, 2004

(54) CONTROLLER INPUT/OUTPUT MODULE VISUAL INDICATOR AND SAFETY MEANS

(75) Inventors: Mark V. Striano, Horsham, PA (US); Michael D. Carney, Havertown, PA (US); Thomas P. Overholt, Chalfont, PA (US); Jack Elias, Lansdale, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/938,955

(22) Filed: Aug. 24, 2001

(65) Prior Publication Data

US 2003/0038728 A1 Feb. 27, 2003

(51) Int. Cl.[7] ................................................. G08B 5/00
(52) U.S. Cl. ............... 340/815.4; 340/332; 340/815.45; 340/815.47; 340/815.73; 307/10.1; 307/125; 307/139; 315/316
(58) Field of Search .............................. 340/332, 815.4, 340/815.42, 815.45, 815.47, 815.73; 307/10.1, 125, 139; 315/316

(56) References Cited

U.S. PATENT DOCUMENTS

| 4,365,245 A | * | 12/1982 | Colmenero .............. 340/815.4 |
| 4,829,596 A | * | 5/1989 | Barina ........................ 455/612 |
| 5,741,161 A | | 4/1998 | Cahaly et al. |

OTHER PUBLICATIONS

Honeywell, "UMC 800 Controller Installation and User Guide"; Rev. 2 12/98; 88 pgs..

* cited by examiner

*Primary Examiner*—Daryl Pope
(74) *Attorney, Agent, or Firm*—Snell & Wilmer (57) ABSTRACT

A controller input/output module visual indicator and safety means including a light redirector, terminal block assembly and at least one circuit having at least one light emitting diode or like light transmission means positioned distally from terminal block assembly. Each light redirector is configured to receive light from each corresponding light transmission means on a proximate end and redirect the light information to a distal end adjacent to the terminal block assembly for viewing by the control operator. An optional shield or side barrier may optionally be coupled to the circuit to provide operator safety from the high voltage signals which may exist on each input/output module.

23 Claims, 8 Drawing Sheets

CONTROLLER INPUT/OUTPUT MODULE VISUAL INDICATOR AND SAFETY MEANS

FIELD OF INVENTION

The present invention generally relates to controllers, and more particularly, to visual indicators and safety devices in a module coupled to at least one controller.

BACKGROUND OF THE INVENTION

Controllers are known in the industry as devices or systems which are configured to control a process, whether for large applications or small applications. One example of a controller is the UMC 800 controller unit manufactured by Honeywell of Fort Washington, Pa. This particular controller is a modular controller configured to address the analog and digital control requirements of small unit processes. This controller includes up to sixteen analog control loops, setpoint programmers and a plurality of analog and digital control algorithms. This controller, for example, also typically includes a power supply module which connects into the controller common backplane, a central processing unit (CPU) module with communications ports, a backplane assembly in communication with the input and output modules, at least one input/output processing module in communication with the common backplane and removable terminal blocks that connect input/output modules with the field wiring. All of these components are typically enclosed within the controller, which is mounted within a housing structure or cage which is tolerant of specified environmental parameters (such as, for example, temperature, humidity, vibration, mechanical shock and like environmental parameters).

Figure 1:
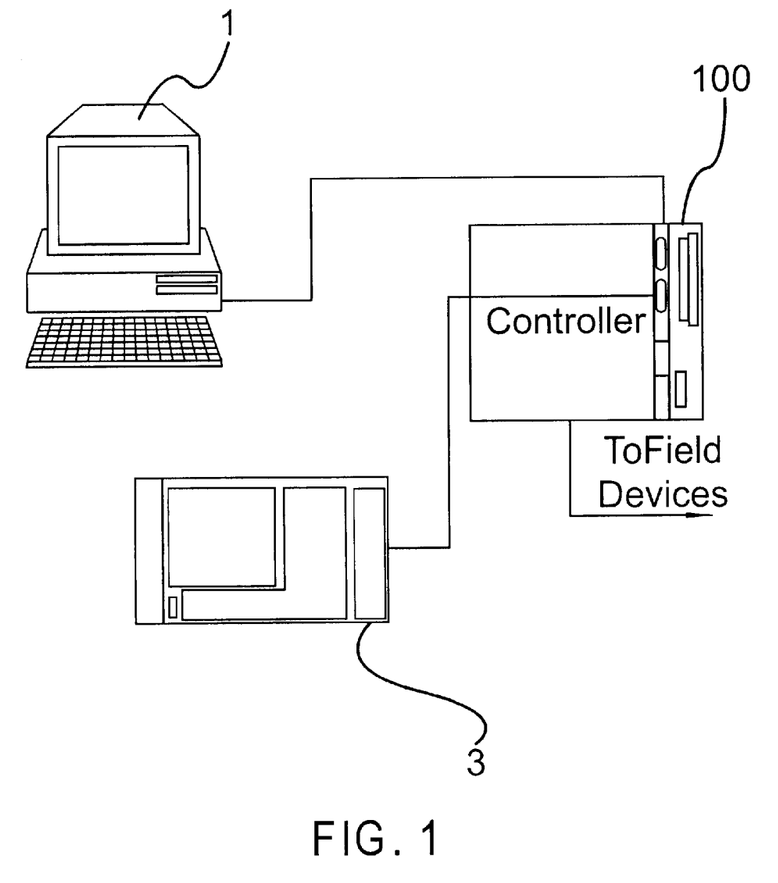
FIG. 1 illustrates a typical controller in communication with a host processor and control interface or operator panel.

Controllers, such as the UMC 800, are typically configured to control numerous types of applications, including furnaces, environmental chambers, ovens, reactors, cookers, freeze dryers, extruders and like processes having control requirements. FIG. 1 illustrates a block diagram of a typical relationship between a processing system 1, an operator panel 3 and a controller 100, all in communication. Each customer typically sets up the controller according to the customer's needs. As such, for example, a customer may be controlling moving parts, conveyors, temperature in an oven and pressure, all depending on the customer's requirements for control. If the module requires service or updates, each module can be removed from the housing structure, however, such removal may require the overall control process to be halted while the module is switched out with another module.

In a typical configuration, the controller 100 incorporates card slots capable of supporting a plurality of input and output modules (not shown) which can be mixed according to the customer's control hardware requirements. The operator panel or interface 3 is usually a display known to those of skill in the art which provides a display presentation of various control parameters, including, for example, control loops, setpoint programs and other analog and digital circuitry status. Suitable software may reside on the processing system 1 which uses graphic symbols and lines to create custom control strategies. Further, calibration of the analog input and output modules may also be performed through the processing system 1.

One problem associated with controller systems is that controller operators sometimes have difficulty determining whether a particular module is operating properly. In some modules, light emitting diodes (LEDs) communicate electrically with circuitry in each module to provide a visual indication of the circuitry operation, however, the LEDs in each input/output module were mounted adjacent to the field wiring (e.g., where an operator places his wiring at each module). Moreover, in the types of applications in which controllers are used, very high voltage signals may exist in and around the field wiring of the input/output modules and thus, the high voltage signals may be coupled to modules within the controller unit. What is needed is an input/output module which provides a superior visual indicator of the module's operating health, as well as a module which provides operator safety from the high voltage signals which may exist on each module.

SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

A controller input/output module visual indicator and safety means is herewith disclosed including a light redirector, optional side barrier, terminal block assembly and a circuit having at least one light emitting diode, surface emitting laser, vertical cavity surface emitting laser or like light transmission means positioned distally from terminal block assembly. Each light redirector is configured to receive light from each corresponding light transmission means on a proximate end and redirect the light information to a distal end adjacent to the terminal block assembly for viewing by the control operator. An optional shield or side barrier can be coupled to the circuit to provide operator safety from the high voltage signals which may exist at the front of each controller module.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

Additional aspects of the present invention will become evident upon reviewing the non-limiting embodiments described in the specification and the claims taken in conjunction with the accompanying figures, wherein like reference numerals denote like elements.

DETAILED DESCRIPTION

Systems and methods in accordance with various aspects of the present invention provide a controller input/output module visual indicator and safety means. In this regard, the present invention may be described herein in terms of functional block components and various processing steps. It should be appreciated that such functional blocks may be realized by any number of hardware, firmware, and/or software components configured to perform the specified functions. For example, the present invention may employ various circuitry and software means such as microprocessors, microcontrollers, integrated circuit components, memory elements, digital signal processing elements, look-up tables, databases, and the like, which may carry out a variety of functions under the control of one or more microprocessors or other control devices. Such general techniques and components that are known to those skilled in the art are not described in detail herein.

It should further be understood that the exemplary process or processes illustrated may include more or less steps or may be performed in the context of a larger processing scheme. Furthermore, the various flowcharts presented in the drawing figures are not to be construed as limiting the order in which the individual process steps may be performed.

Figure 2:
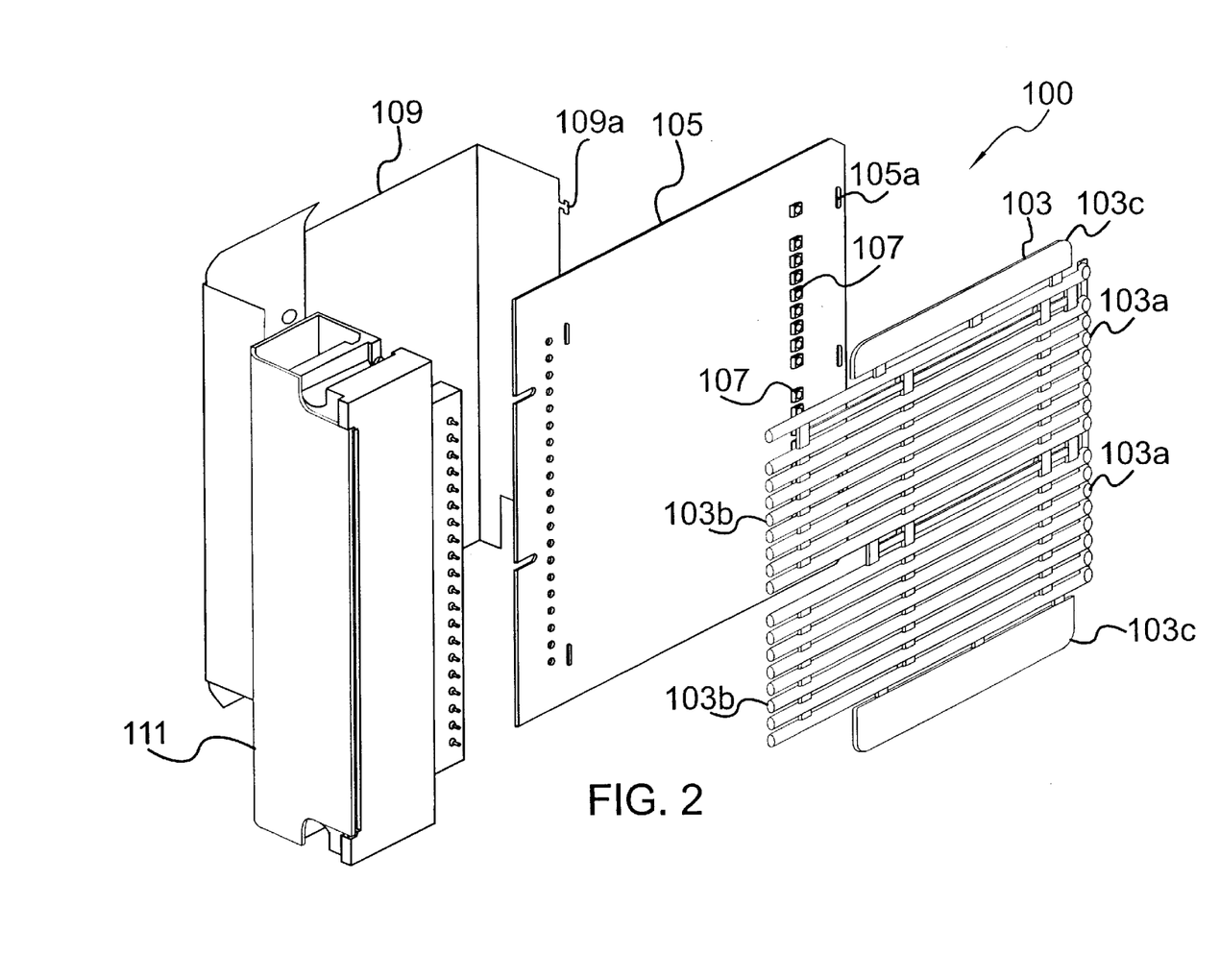
FIG. 2 is a right side perspective view of one embodiment of the present invention.

Referring now to FIG. 2, the present invention is a controller input and output module visual indicator and safety means 100 including a light redirector 103, optional side barrier 109, terminal block assembly 111 and circuit 105 having at least one LED 107 located away from terminal block assembly 111.

In one embodiment of the present invention, the circuit 105 is a printed circuit board, is configured to communicate with a processing means (such as, for example, illustrated in FIG. 1), any operator interface panels and is further configured to communicate with other modules within a controller to obtain system health and status information. In one embodiment, the system health and status information activates the circuit 105, which drives each LED 107b to emit light. In another exemplary embodiment, each LED 107a and 107b is positioned sufficiently away from the terminal block assembly 111 (such as, for example, opposite the terminal block assembly 111) in order to alleviate any high voltage signal crossover that may exist from signals adjacent to or in communication with the terminal block assembly 111. Further, this configuration is useful when the present invention is used in hot swap or removable module applications. Those of skill in the art will realize that this configuration allows the proper operation of low-voltage LED or similar light transmission devices in high voltage applications that may occur during the control process. In one preferred embodiment, at least seventeen LEDs are employed to illustrate the operation of each module's operational health with at least one additional LED used for diagnostic purposes.

Figure 3:
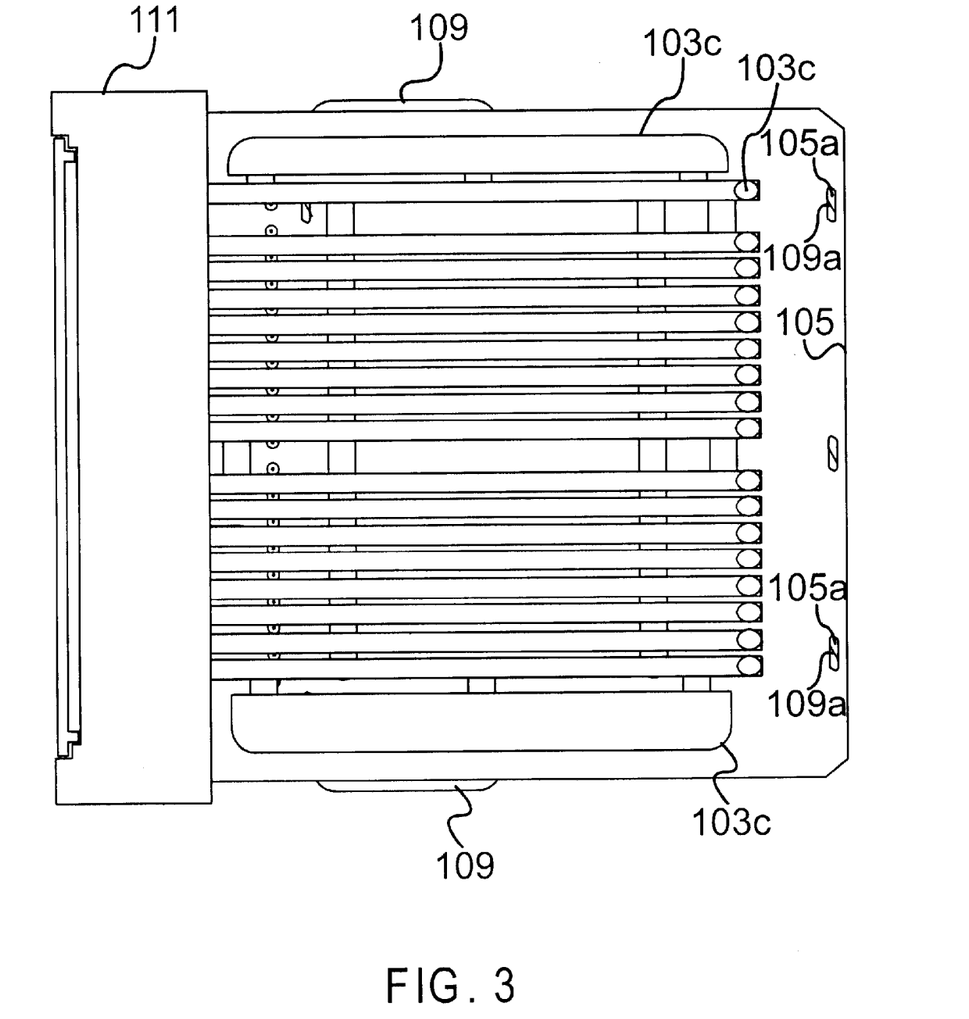
FIG. 3 is a right side plan view of the invention illustrated in FIG. 2.
Figure 6:
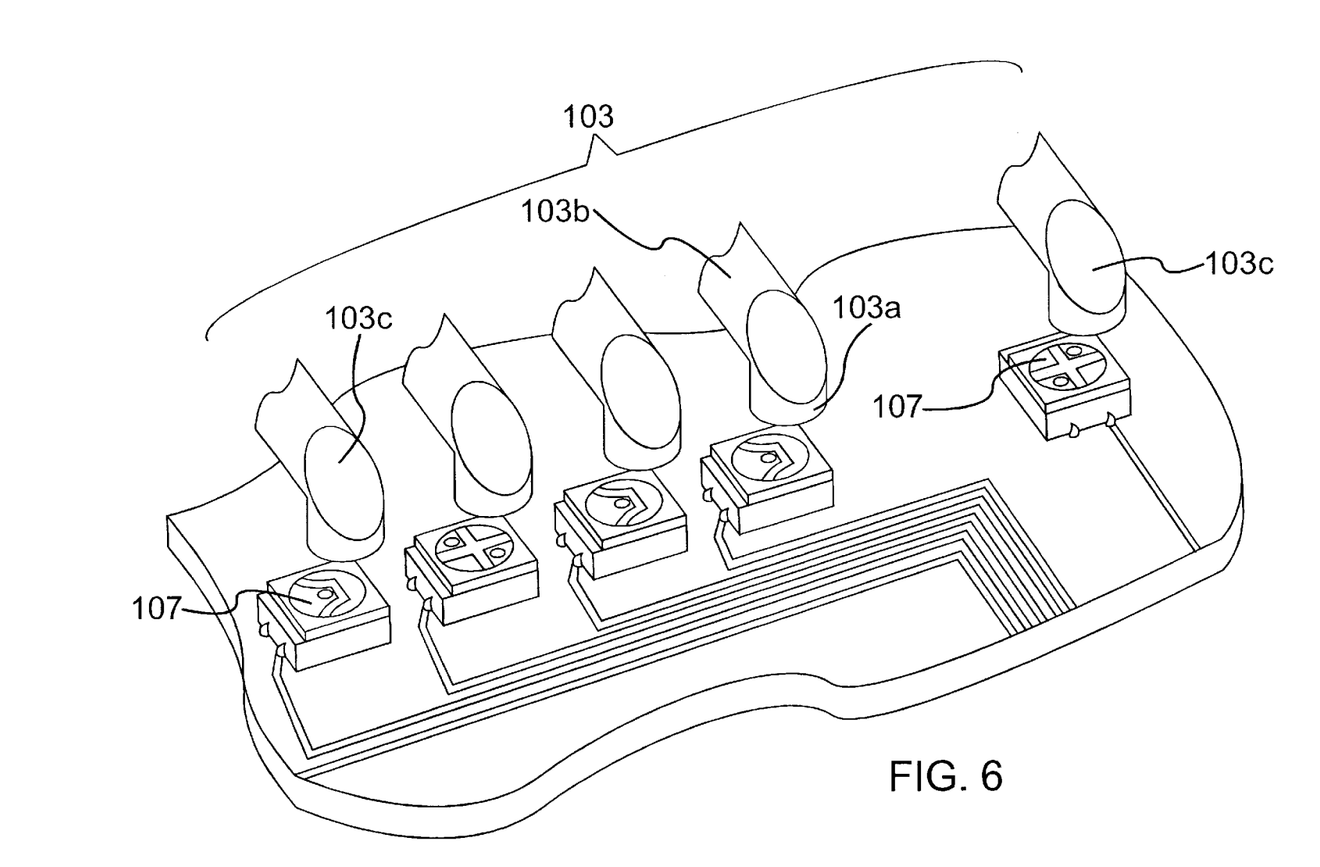
FIG. 6 is a detailed view of representative LEDs or like light emitting devices employed in the present invention and being adjacent to the light transmission means.

As seen in FIGS. 2 and 3, at least one light redirector 103, otherwise referred to as a light pipe, is coupled to the circuit 105 and is positioned proximately parallel to the plane of circuit 105. Each light redirector 103 is configured to receive light from each corresponding LED 107 on circuit 105 on a proximate end 103a and transmit the light information to a distal end 103b adjacent to the terminal block assembly 111. In one embodiment, light from each LED 107 is transmitted substantially perpendicular to the circuit 105 so that light redirection means' proximate end 103a is formed to have an approximately ninety (90) degree bend with approximately forty-five (45) degree angle cuts 103c as seen in FIG. 6. Those skilled in the art will recognize that other angles are possible depending on the application. In this regard, those of skill in the art will realize that light emitted from LED 107 is transmitted through proximate end 103a, reflected off angle cut 103c and thereby transmitted to distal end 103b. In one embodiment, at least seventeen LEDs are used. Each light redirector 103 may be formed of any suitable plastic, fiber optic or like light transmission means, and in another embodiment, is made from polycarbonate or like polymer available from, for example, General Electric. As seen in FIG. 2, light redirector may be formed, for example, as a single unit having multiple light pipes corresponding to each LED. Those of skill in the art will realize that light redirector 103 may further be configured to provide electrical shock protection from any electrical signals from circuitry mean 105. As such, light redirector may further include one or more protrusions 103c configured to further cover those portions of the circuit 105 which may be electrically charged. Those of skill in the art will realize that each protrusion 103c thus is configured to protect the operator from electrical shock and prevent the circuit 105 from being disabled due to electrostatic discharge.

Figure 4:
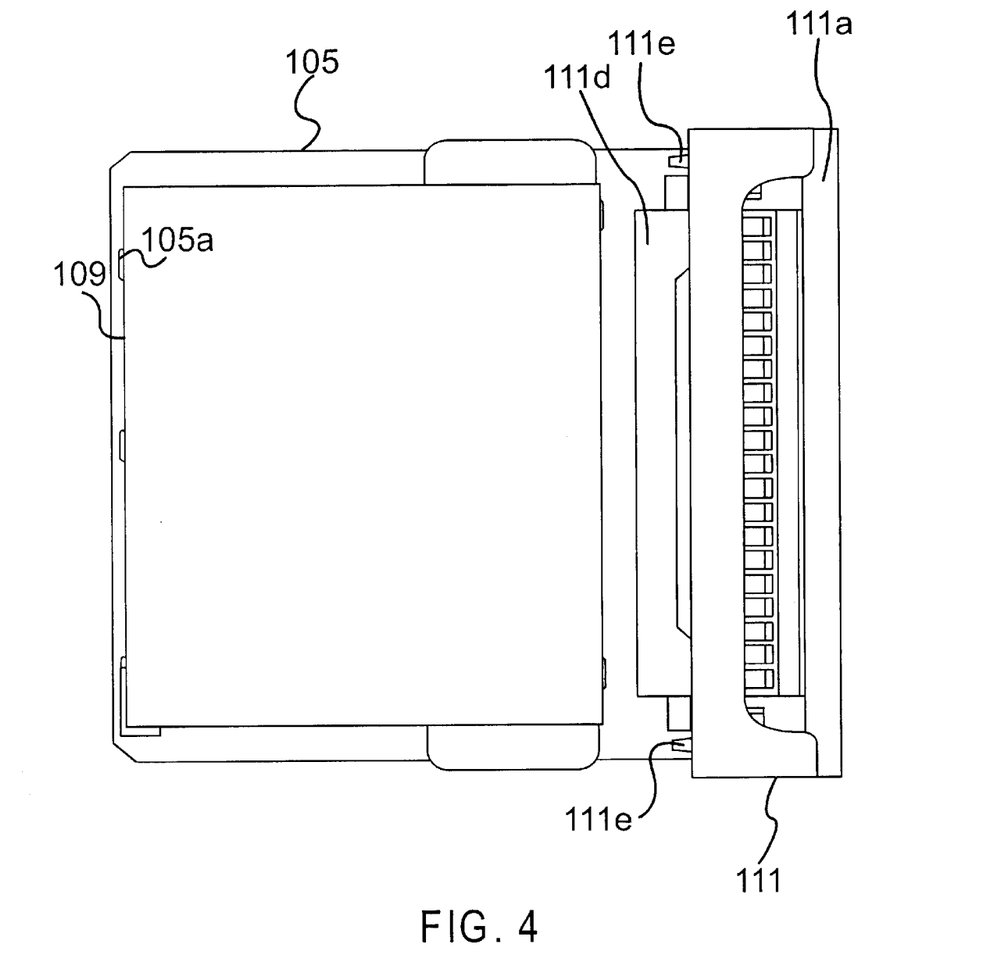
FIG. 4 is a left side plan view of the invention illustrated in FIG. 2.
Figure 5:
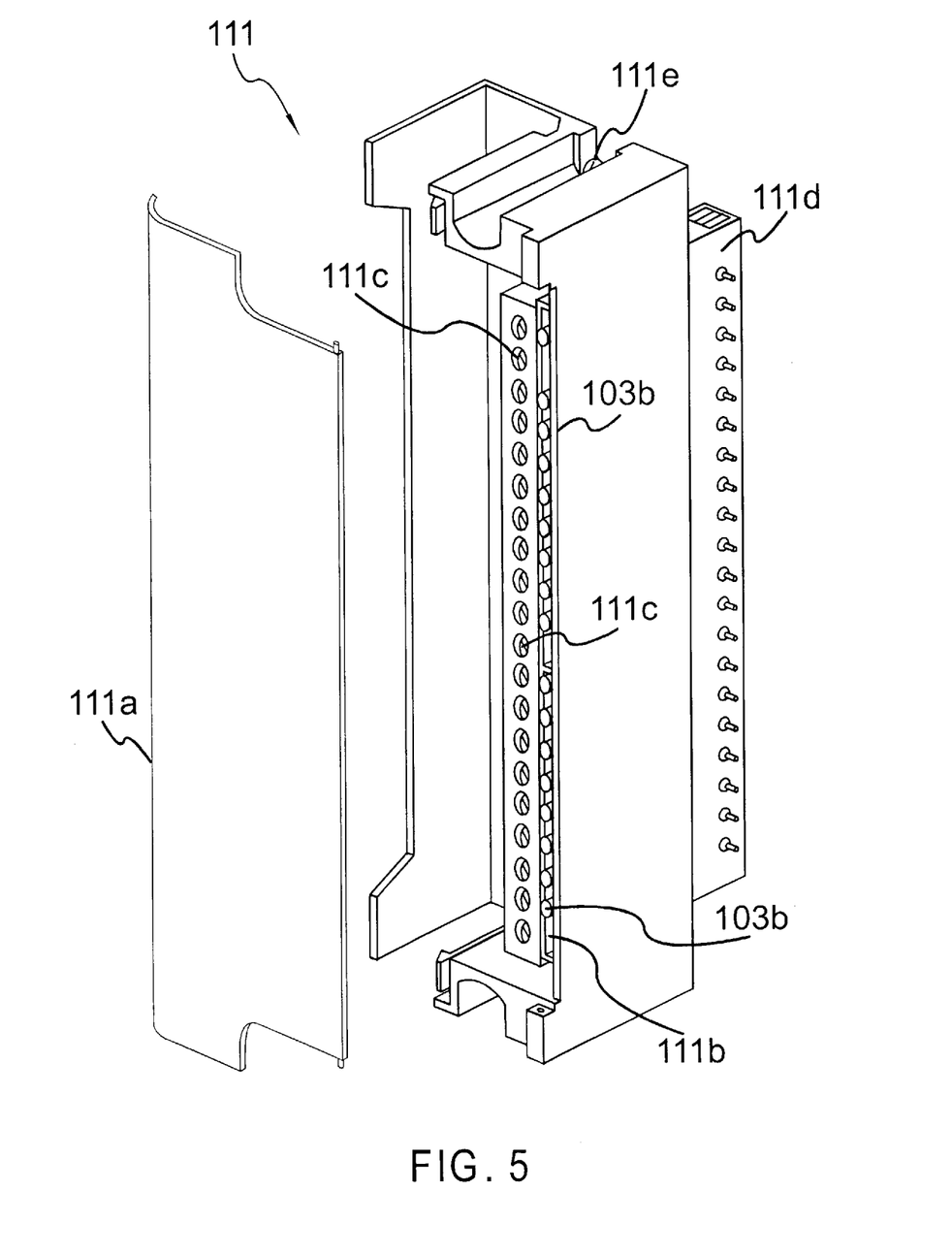
FIG. 5 is a partially exploded view illustrating the terminal block assembly of the present invention.

Terminal block assembly 111 includes terminal block assembly circuitry 111c in communication with circuit 105 by conventional communicating means 111d and further includes an elongated channel 111b formed therein for receiving the distal end 103b of light redirector 103. Terminal block assembly 111 preferably includes a hinged door 111a or other opening to allow a service operator access to electrical connections for field wiring from external sources. Preferably, door 111a is sufficiently or suitably transparent to allow light emitted from light redirector' distal end 103b to be viewed by the service operator. In this fashion, those of skill in the art will realize that the light transmitted by the LEDs at the rear portion of circuit 103 is thereby redirected for viewing by an operator through the transparent hinged door 111a. In this regard, the service operator can review the operation of the controller without being exposed to any electrical hazards. Terminal block assembly 111 further includes coupling means 111e (as seen, for example, in FIG. 4) which allows the assembly to be coupled to circuit 103. In this regard, an operator may remove the terminal block assembly 111 from the circuit 105 by disconnecting coupling means 111e. This event might occur, for example, when the circuit requires replacement.

Side barrier 109 is optionally coupled to the circuit 103, covers substantially the plane of the circuit and is employed to provide electrical shock protection from any electrical signals from circuit 105. In one preferred embodiment, side barrier 109 is coupled to the circuit 105 by conventional manufacturing techniques. Thus, for example, slots 105a may be formed in circuit 105 to receive tabs 109a formed on side barrier 109a. Tabs 109a may further be structurally reinforced to attachment to circuit 105 by conventional soldering. Side barrier 109 can be made of any suitable material such as sheet metal, but also, those of skill in the art will appreciate that side barrier 109 may be made of any suitable non-conductive material such as plastic. Side barrier 109 further has the advantage of providing structural stability to the circuit 103.

Figure 7:
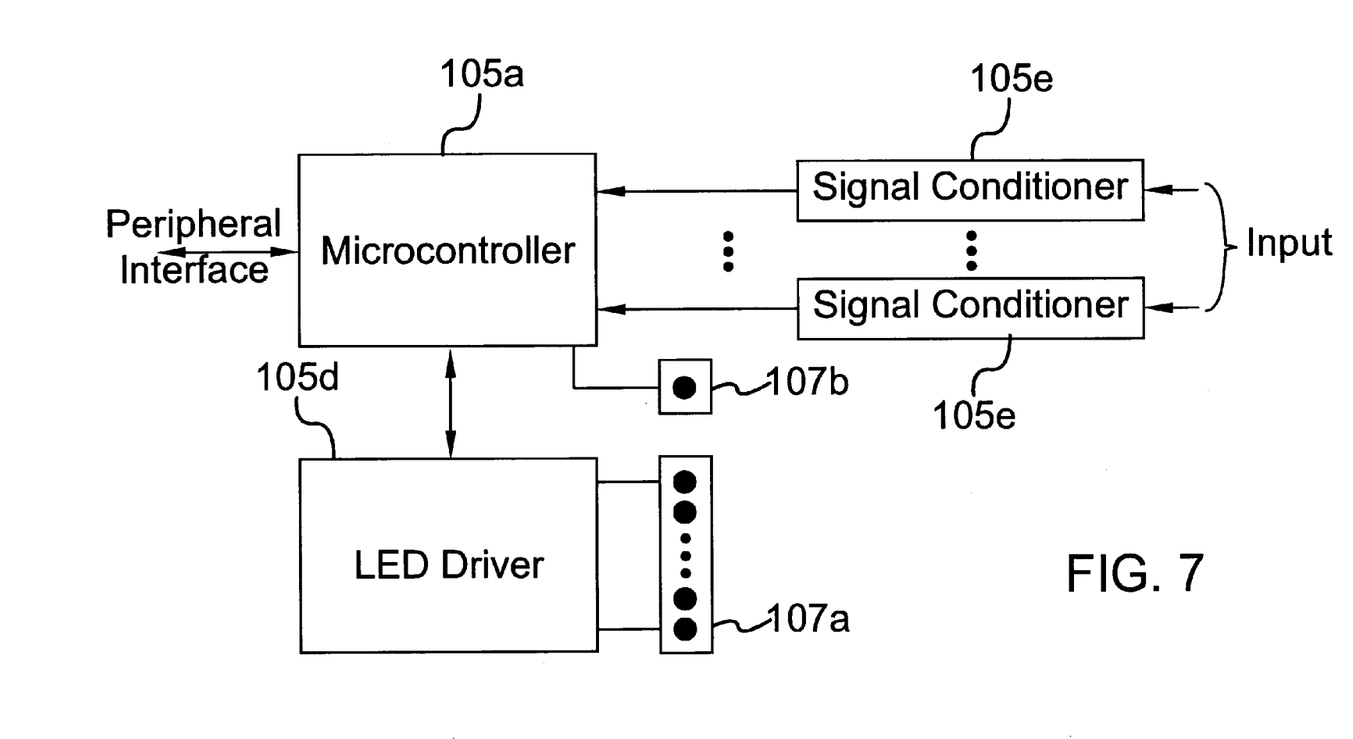
FIG. 7 illustrates an exemplary input module functional block diagram of an exemplary circuit of the present invention.

FIG. 7 illustrates an exemplary input module functional block diagram of circuit 105. In this embodiment, a customer's field wiring provides an input signal to the signal conditioner 105e of the input module. The signal conditioner 105e is configured to condition the input signal to set the proper operating characteristics of each input signal. The ON or OFF state of each signal conditioner 105e is detected by a microcontroller 105c or like processing means which in turn transmits this information to the LED driver to drive the LED 107a associated with each input signal. The microcontroller 105a also drives the status LED 107b to indicate the health or status of the input module as well as distributing the ON or OFF state of each input to the main controller via the peripheral interface and the controller backplane. The microcontroller uses the ON or OFF state of each input signal to implement the customer's control strategy.

Figure 8:
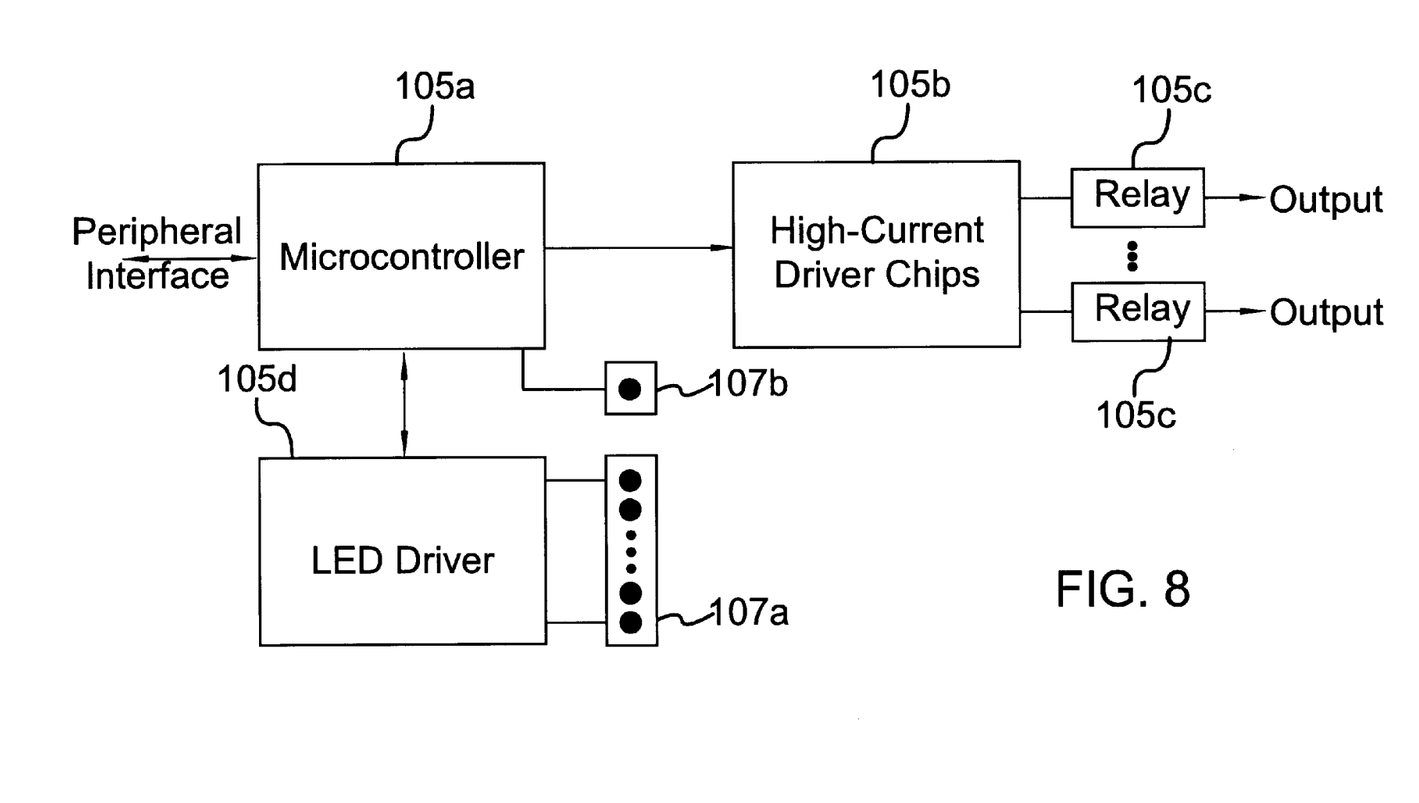
FIG. 8 illustrates an exemplary output module functional block diagram of an exemplary circuit of the present invention.

FIG. 8 illustrates an exemplary output module functional block diagram of an exemplary circuit of the present invention. The function of a typical output module is the reverse of the input functionality described above. In this embodiment, the controller 105a transmits the customer's desired control information, ON or OFF state for each output, to the output module's microcontroller 105a through the peripheral interface between the controller backplane and the microcontroller. Each microcontroller 105a transmits ON or OFF information to driver circuitry 105b to turn each relay 105c ON or OFF. Each relay 105c then drives the output circuitry for each output. The microcontroller 105a also transmits the ON or OFF information to the LED driver 105d to turn ON or OFF the LED 107a associated with each output. The microcontroller 105a also drives the status LED 107b of the output module to indicate the health or status of the module.

Thus, as will be clear to one of skill in the art, the present invention provides visual indications of each module's operating characteristics and further provides a safety mechanism to prevent an operator from being electrically shocked if the module requires physical handling. In operation, the present invention allows an operator to view input and output point and status point indicators without the danger of being exposed to hazardous electrical voltages, and further provides improved immunity properties for control modules from system and environmental influences. Moreover, those of skill in the art will now realize that both the light redirector and the side barrier provide protection of circuitry from the operator such as electrostatic discharge.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a controller input/output module visual indicator and safety device, is followed.

What is claimed is:

1. A module visual indicator apparatus for a controller comprising:
   a terminal block assembly having a channel formed therein;
   a circuit coupled to the terminal block assembly on a first end, the circuit having at least one light transmission means thereon adjacent to a second end, wherein each light transmission means comprises a light emitting diode; and
   a light redirector coupled to the circuit, the light redirector having a proximate end and a distal end, the proximate end being adjacent to the light transmission means, the channel configured to receive the distal end, wherein each light redirector is configured to receive light from each light transmission means at the proximate end and transmit the light to the distal end, each light redirector further configured to have an approximately ninety degree bend with approximately forty-five degree angle cuts adjacent to each proximate end.

2. The apparatus of claim 1, the circuit being in communication with a processing means.

3. The apparatus of claim 1, the terminal block assembly being in communication with the circuit by a communicating means.

4. The apparatus of claim 3, the terminal block assembly further including an access door.

5. The apparatus of claim 4, the door being substantially transparent.

6. The apparatus of claim 5, the terminal block assembly further including coupling means coupling the assembly to the circuit.

7. The apparatus of claim 6, the apparatus further comprising a side barrier coupled to the circuit.

8. The apparatus of claim 7, the side barrier further including a plurality of tabs, the circuit further comprising a plurality of slots, each slot configured to suitably receive each corresponding tab.

9. The apparatus of claim 7, the side barrier further substantially covering a plane of the circuit.

10. A controller input/out module visual indicator and safety device comprising a light redirector, a circuit and a terminal block assembly coupled to the light redirector and the circuit, the circuit having at least one light transmission means positioned distally from the terminal block assembly, the device insertable within the controller, wherein each light redirector is configured to receive light from each corresponding light transmission means on a proximate end and redirect the light to a distal end adjacent to the terminal block assembly, each light redirector further configured to have a ninety degree bend with forty-five degree angle cuts adjacent to each proximate end, and each light transmission means comprises a light emitting diode.

11. The apparatus of claim 10, the circuit being in communication with a processing means and an operator interface.

12. The apparatus of claim 10, the terminal block assembly being in communication with the circuit by a communicating means.

13. The apparatus of claim 12, the terminal block assembly further including an access door.

14. The apparatus of claim 13, the door being transparent.

15. The apparatus of claim 14, the terminal block assembly further including removable coupling means coupling the assembly to the circuit.

16. The device of claim 10 further comprising a side barrier coupled to the circuit.

17. The apparatus of claim 16, the side barrier further including a plurality of tabs, the circuit further comprising a plurality of slots, each slot configured to suitably receive each corresponding tabs.

18. The apparatus of claim 17, the side barrier further substantially covering the plane of the circuit.

19. A controller module visual indicator apparatus comprising a terminal block assembly having a channel formed therein, a circuit coupled to the terminal block assembly on a first end, the circuit having at least one light transmission means thereon adjacent to a second end, a light redirector coupled to the circuit on a first side of the circuit, and a protective barrier coupled to the circuit on a second side of the circuit, the light redirector having a proximate end and a distal end, the proximate end being adjacent to the light transmission means, the channel configured to receive the distal end, wherein each light redirector is configured to receive light from each corresponding light transmission means on a proximate end and redirect the light to a distal end adjacent to the terminal block assembly for viewing by a control operator, each light redirector further configured to have a ninety degree bend with forty-five degree angle cuts adjacent to each proximate end, and each light transmission means comprises a light emitting diode.

20. The apparatus of claim 19, the circuit being in communication with a processing means and an operator interface, the terminal block assembly being in communication with the circuit by a communicating means.

21. The apparatus of claim 19, the terminal block assembly further including a transparent access door.

22. The apparatus of claim 21, the terminal block assembly further including removable coupling means coupling the assembly to the circuit.

23. The apparatus of claim 19, each light redirector further including at least one protrusion configured to cover portions of the circuit.

* * * * *